United States Patent [19]
Lyszczasz

[11] Patent Number: 5,310,245
[45] Date of Patent: May 10, 1994

[54] CUSHION SUPPORT APPARATUS FOR INFANTS

[76] Inventor: Christine Lyszczasz, 1113 Maltby Ave., South Plainfield, N.J. 07080

[21] Appl. No.: 959,799

[22] Filed: Oct. 13, 1992

Related U.S. Application Data

[63] Continuation of Ser. No. 848,642, Mar. 9, 1992, abandoned.

[51] Int. Cl.$^5$ .................. A47C 7/38; A47C 7/52; A47C 31/11
[52] U.S. Cl. .................. 297/219.12; 5/655; 5/922; 297/230.1; 297/284.9; 297/397; 297/DIG. 6
[58] Field of Search ............ 5/655, 637, 636, 640, 5/922, 420, 465; 297/391, 397, 485, 464, 229, 250, 231, 230, 219.12, 230.1, 284.9, DIG. 6

[56] References Cited

U.S. PATENT DOCUMENTS

| | | | |
|---|---|---|---|
| 3,174,163 | 3/1965 | Gibson | 5/640 |
| 4,383,713 | 5/1983 | Roston | 5/655 |
| 4,565,405 | 1/1986 | Mayer | 297/391 |
| 4,695,092 | 9/1987 | Hittie | 297/250 |
| 5,056,533 | 10/1991 | Solano | 128/876 |

FOREIGN PATENT DOCUMENTS 990112  4/1965  United Kingdom ............... 297/464

Primary Examiner—Alexander Grosz
Attorney, Agent, or Firm—Clifford G. Frayne

[57] ABSTRACT

A cushion support for infants for use in cooperation with infant transport apparatus such as car seats, the support apparatus aiding in maintaining the infant's body in a proper posture. The apparatus is a T-shaped cushion member having a plurality of hook and loop fasteners, the T-shaped cushion member conformable to the shape of the car seat or baby seat, the hook and loop fasteners permitting the planar cushion to be rolled and secured to provide for lateral cushion support adjacent the infant's head and to permit the positioning of lateral cushion supports on the baby's sides.

9 Claims, 4 Drawing Sheets

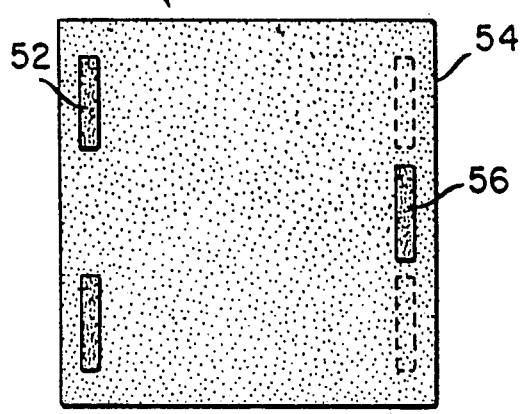
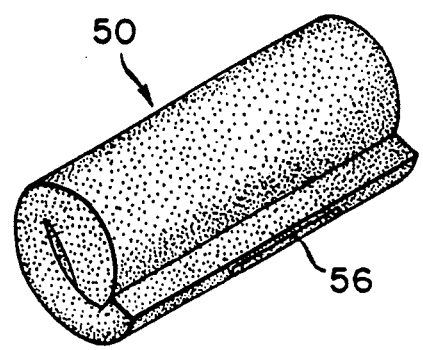
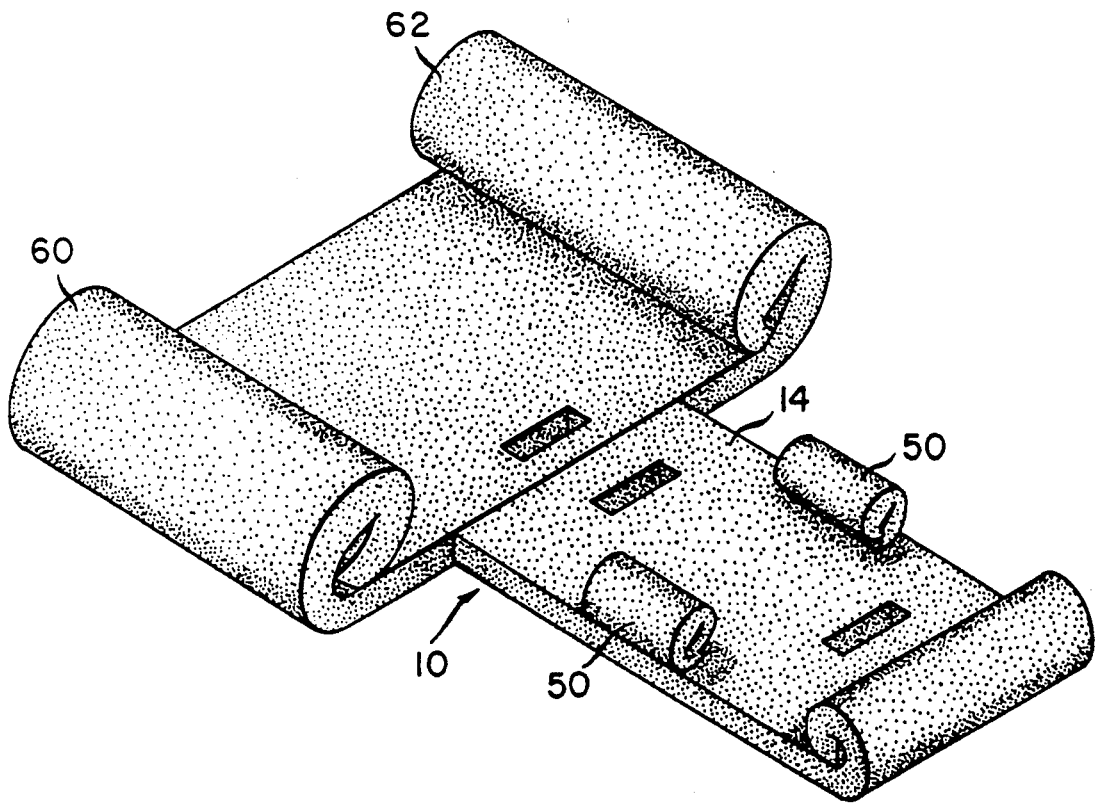

CUSHION SUPPORT APPARATUS FOR INFANTS

This is a division of application Ser. No. 07/848,642, filed Mar. 9, 1992, now abandoned.

BACKGROUND OF THE INVENTION

This invention relates to a cushion support apparatus for infants for providing support while the infant child is in a seated position, the support apparatus being fully adjustable to accommodate the infant child as he or she grows, the apparatus being adaptable to cooperate with a variety of different types of children's seating apparatus.

Small children, such as infants from a few months old to one to two years old cannot adequately support themselves conveniently in a seated position. This problem is aggravated with premature babies who are initially underweight. The problem manifests itself when the child is placed in a car seat, stroller, high chair, or other form of seating or carrier arrangement for infants. The infant's head will tilt or hang to the left or the right and find support in the shoulder or chest region when the infant falls asleep, which occurs frequently with young children. A further tendency is for the child to slide downwardly in the seat or carrier to an unnatural, posture-poor position. It is preferred that the infant be supported in the transportation mode, at an approximate 45° angle or less. This is to prevent the young infant who has not developed muscle control from pitching forward. The straps or harnesses are normally utilized to further prevent this occurrence. An infant so positioned, particularly when being transported, will have the tendency to fall asleep and having insufficiently developed muscle control, will tend to have its head tilted to the side.

In these early formative stages of life, it is important that the child be supported correctly from an orthopedic standpoint in order to aid in proper growth and bone development so as to avoid or eliminate possible skeletal problems in later years. It is of particular importance to the infant and to the infant's parents that the child be supported in such a manner.

It is further recognized that infant children rely upon their parents for transportation in their early years. Small infants accompany their parents more and more frequently, not only in shopping, traveling and visiting situations, but small infants also require frequent visits to the physician to check on their development. As such, the small child is subjected to a variety of different transportation modes from car seats, strollers, baby seats, and baby carriers. It is therefore important that the parent have a convenient, light-weight and adaptable support apparatus which can easily be affixed to any one of the foregoing transportation modes for support of the infant child and which will be adaptable to the infant child and his or her growth stages during the early formative years of life.

The prior art has directed its attention to this problem in an attempt to offer a solution. The prior art suffers from its inability to adapt to different modes of transportation, its awkwardness or cumbersomeness and its inability to accommodate the growing child. U.S. Pat. No. 4,436,341 is a self-contained car seat adaptable for only that purpose. U.S. Pat. No. 4,402,548 again provides for a safety seat which is cumbersome and not adaptable to different modes of transportation. U.S. Pat. No. 4,441,221 provides for a child's support wedge which does not address nor solve the problem of supporting an infant's tilting head. U.S. Pat. No. 4,383,713 provides for an orthopedic support apparatus, but again, there is no provision for adapting the apparatus for growing infants.

Despite the aforesaid prior art, it has been recognized as recently as 1991 that there is no adequate device available for positioning small infants in car seats and baby seats and the like. These problems were addressed in publications ranging from Pediatrics, Volume 87, No. 1, January 1991; Baby Talk, November 1990; American Baby, February 1991 and Healthy Kids, Winter of 1991. All of the aforesaid articles recognize the problem and the need. The solutions suggested are the use of rolled diapers or towels positioned adjacent the infant's body in order to provide support. Applicant's cushion support provides a solution to the problem and is secured directly to the car seat or baby seat and cooperates with the car seat or baby seat in maintaining the infant in the proper position.

The novelty of the present invention lies in the fact that the apparatus is lightweight, portable, and can be stored in a diaper bag, and is adaptable to different modes of transportation and adaptable to different size children and can be modified as the child grows to accommodate his or her growing proportions.

OBJECTS OF THE INVENTION

An object of the present invention is to provide for a novel support apparatus for infants which provides lateral support for the infant's head.

A further object of the present invention is to provide for a novel support apparatus for infants which provides lateral support for the infant's body.

A still further object of the present invention is to provide for a novel support apparatus for infants which provides vertical support for the infant when in a seated position.

A still further object of the present invention is to provide for a novel support apparatus for infants which is lightweight, portable and adaptable to a variety of different seating transportation apparatus.

A still further object of the present invention is to provide for a novel support apparatus for infants which is adjustable so as to accommodate the different body proportions of the infant as the infant grows.

SUMMARY OF THE INVENTION

A support apparatus for supporting infants when positioned in a seating arrangement in either a car seat, high chair, stroller, baby seat, baby carrier or the like, the support apparatus being flexible to conform to the configuration of the particular seating apparatus, the support apparatus having lateral body and lateral head supports for the infant, the lateral supports being adjustable to accommodate increased proportions of the child as the child grows, the support apparatus having an adjustable vertical support to aid in maintaining the child in a proper, posture-correct seating position, the support apparatus having a plurality of securing straps to secure the support apparatus to the car seat, baby seat or the like so that the support apparatus is contoured to the shape of the baby carrier, yet allows for full use of the straps securing supports associated with the baby carrier.

BRIEF DESCRIPTION OF THE DRAWINGS

These and other objects of the present invention will become more evident, particularly when taken in light of the following illustrations wherein:

FIG. 3 is a front planar view of an auxiliary cushion for use with the support apparatus;

FIG. 3A is a perspective view of the auxiliary cushion;

FIG. 4 is a front view of the apparatus in its rolled user mode;

DETAILED DESCRIPTION OF THE DRAWINGS

Figure 1:
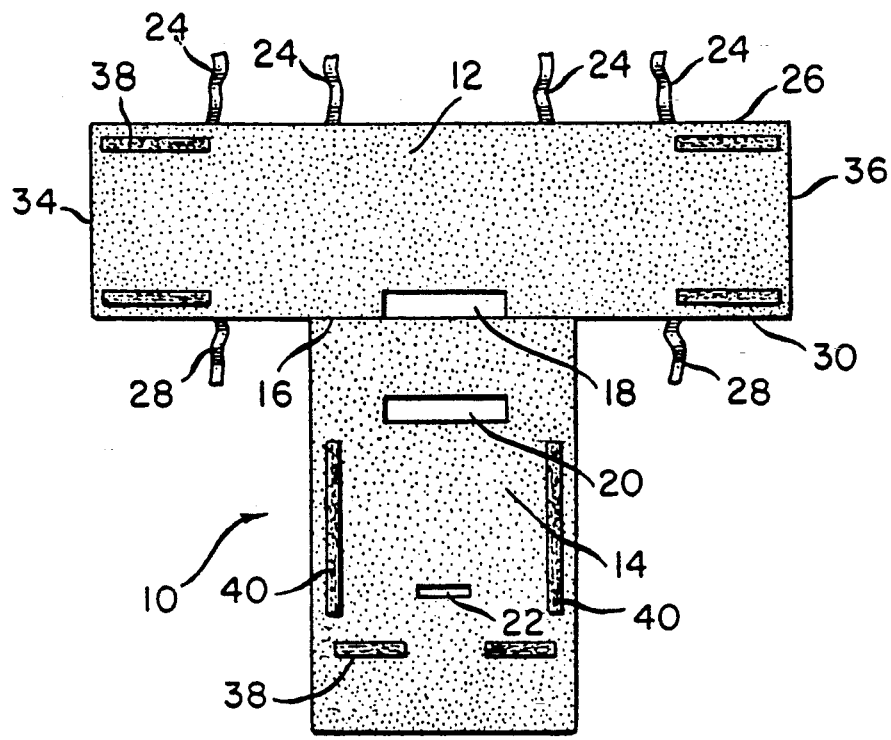
FIG. 1 is a front planar view of the support apparatus.

FIG. 1 illustrates the support apparatus 10 in its unrolled mode prior to use. The support apparatus 10 is generally T-shaped having a generally rectangular cross member portion 12 and a generally rectangular leg member portion 14. Cross member portion 12 and leg member portion 14 may be detachable from each other by a fastening means positioned along their common side 16.

Cross member portion 12 and leg member portion 14 are comprised of an outer fabric covering and an inner cushion enclosed with the fabric covering and secured thereto. The thickness of cross member portion 12 and leg member portion 14 is such that they will provide some cushion support to the infant child, but will not be bulky so as to prevent the support apparatus from conforming to the contours of the child seat, car seat or the like. Support apparatus 10 has positioned therethrough, a plurality of apertures 18, 20 and 22. Apertures 18 and 20 are designed to permit the shoulder straps of the car seat or baby seat to extend therethrough so that they may be utilized to secure the infant child to the seat once the support apparatus 10 has been positioned. Aperture 22 is positioned to cooperate with the crotch strap of the baby seat or car seat and the allow it to be positioned therethrough while positioning the support apparatus 10 onto the seat.

Cross member portion 12 has a plurality of securing straps 24 extending from edge 26 of cross member portion 12. Cross member portion 12 also has a plurality of securing straps 28 extending from edge 30. Securing straps 24 and 28 cooperate with each other in securing support apparatus 10 about the child seat or car seat. Straps 24 and 28 would extend about the contoured rear portion of the car seat or baby seat and be fastened to each other by either tying them together, snap-fitting them together, hook and loop fasteners or other similar fastening means. Securing straps 24 and 28 ensure that support apparatus 10 will be maintained in position within the car seat or baby seat and position apertures 18, 20 and 22 for receipt of the shoulder straps and crotch straps associated with the car seat or baby seat.

Figure 2:
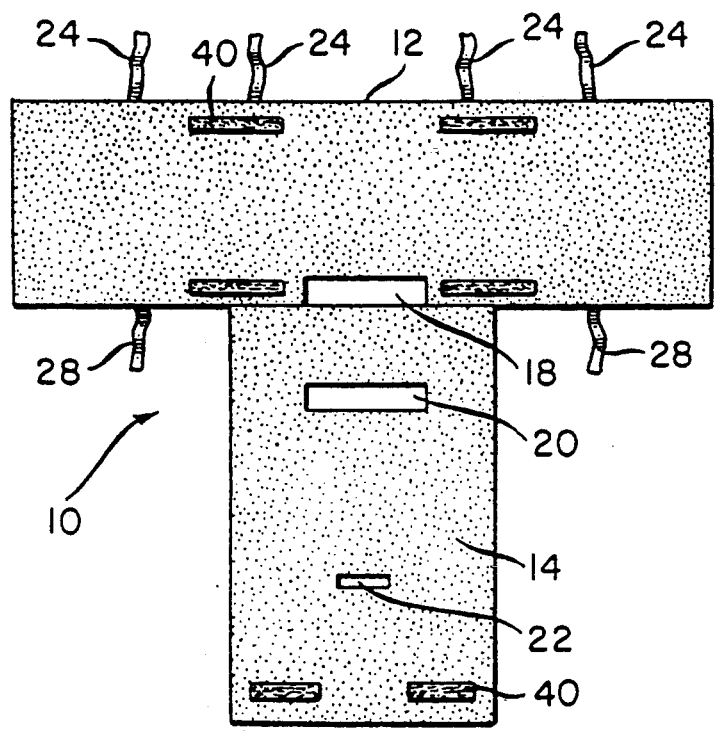
FIG. 2 is a rear planar view of the support apparatus.

Cross member portion 12 is designed such that ends 34 and 36 may be rolled or curled inwardly to form a cylindrical cushion on each side of the infant's head which when placed in a car seat or baby seat having the support apparatus 10 positioned therein, would be located proximate to the mid point of cross member portion 12. In order to secure ends 34 and 36 of cross member portion 12 in a rolled or curled fashion, pairs of hook and loop fasteners are utilized. As illustrated in FIG. 1, the front portion of cross member portion 12 has strips of hook fasteners 38 positioned in the corners of cross member portion 12. Reference to FIG. 2 which is a rear planar view of support apparatus 10 discloses that four (4) loop fasteners 40 are positioned on the opposing side of cross member support 12. Hook fasteners 38 and loop fasteners 40 are secured to the outer fabric covering of cross member support 12. When ends 34 and 36 of cross member portion 12 are rolled or curled towards each other, hook fasteners 38 and loop fasteners 40 cooperate to secure the cylindrical cushion which is formed and illustrated in FIG. 4. Since hook fasteners 38 and loop fasteners 40 are longitudinal strips, they provide a range for cooperation in forming the cylindrical cushions. This allows the parent to provide a snug fit or a looser fit with respect to the cylindrical cushions which would be positioned about the infant's head to prevent it from tilting or bobbing to the side. It also allows the parent to adjust the cylindrical cushions thus formed for the increased size of a child as the child grows.

FIG. 3 is a front planar view of an auxiliary cushion 50 utilized with the support apparatus 10 and FIG. 3A is a perspective view of cushion 50. Auxiliary cushion 50 is of the same construction as support apparatus 10 and is dimensioned to be rolled into a cylindrical shape and maintained in such shape by a pair of hook and loop fasteners 52 and 54, respectively. When positioned in its cylindrical mode, auxiliary cushion 50 has a hook fastener 56 positioned on its outer circumference. This hook fastener is designed to position auxiliary cushion 50 along the lateral edges of leg member portion 14 to provide a cushioning and positioning means proximate to the lower torso of the infant child. Additionally, the hook and loop fasteners 38 and 40 positioned at the lower end of leg member portion 14 are designed to cooperate such that the lower portion of leg member portion 14 can be rolled into a cylindrical shape to provide support to prevent the infant child from sliding downwardly in the car seat or baby seat.

Referring again to FIG. 4, there is illustrated a front planar view of the support apparatus 10 with the support cushion in a rolled or curled mode. Auxiliary cushions 50 have been secured to the lateral edges of leg member portion 14 and ends 34 and 36 of cross member portion 12 have been rolled or curled inwardly such that hook and loop fasteners 38 and 40, respectively, are engaged to form two cylindrical cushions 60 and 62 which would be positioned on the sides of the infant's head.

Figure 5:
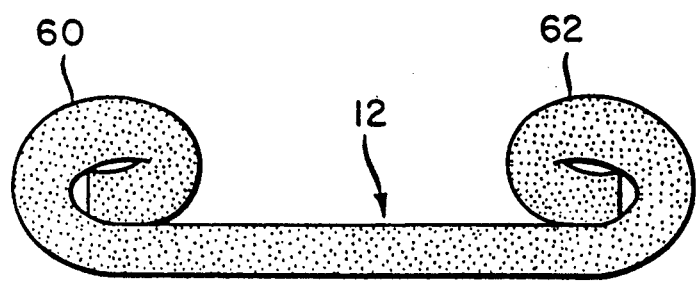
FIG. 5 is a partial top view of the support apparatus.
Figure 6:
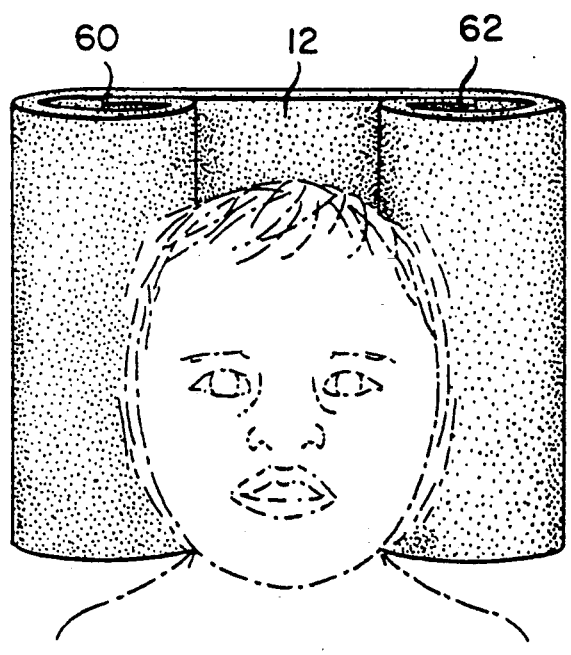
FIG. 6 is a front view illustrating the positioning of the support apparatus with an infant.

Reference to FIGS. 5 and 6 which are a top view and a front view, respectively, of the seating apparatus with respect to an infant's head, show the relationship between the cushion elements 60 and 62 and the infant's head. The size of cushion element 60 and 62 and their relative distance from each other is determined by the size of the infant and cushion element 60 and 62 are adjusted accordingly through the cooperative engagement of hook and loop fasteners 38 and 40.

An additional feature of cushion support apparatus 10 is the detachability of cross member portion 12 from leg member portion 14 along their common edge. Any suitable fastener such as a zipper, buttons or snap-fits could be utilized to secure these two cushion support members together. With a newborn or extremely small infant, it would be recommended that both members be utilized in conjunction with each other. However, as the child matures, the need for leg member portion 14 may no longer be required. Therefore, it could be removed from cross member portion 12 and the parent could continue to use cross member portion 12 as described heretofore to prevent the infant or child's head from tilting when the child is sleeping. Securing straps 24 and 28 are attached to cross member portion 12 which still permits cross member portion 12 to be secured to the car seat, baby seat or the like in order to maintain it in position.

Figure 7:
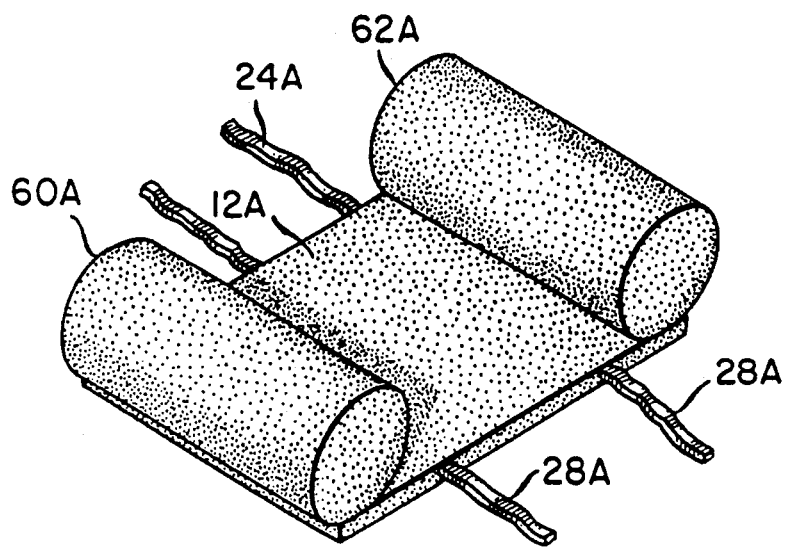
FIGS. 7 and 7A are perspective views of an additional embodiment of the support apparatus.
Figure 7A:
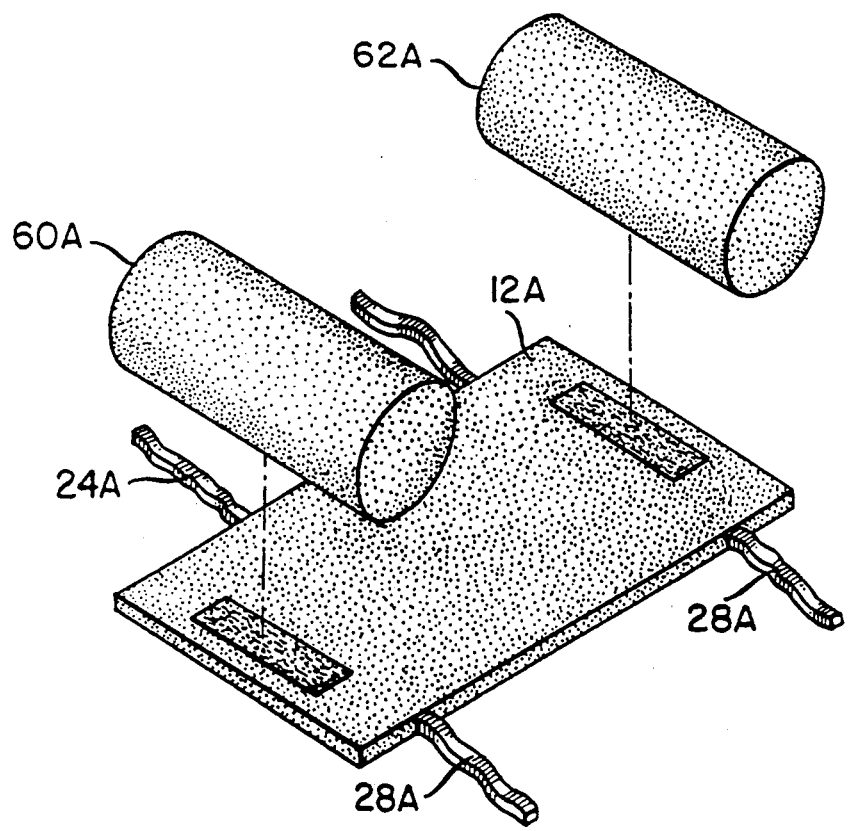

A final embodiment of the cushion support apparatus is illustrated in FIG. 7 and 7A. This embodiment is similar to those discussed previously, but rather than being adjustable for different size infants by rolling up the ends of the cross member, it is manufactured in various sizes with the parent choosing the appropriate size and eventually increasing the size as the infant matures. In this embodiment, a cross member portion 12A is identical to that as discussed with respect to the first embodiment. However, cushion element 60A and 62A are either preformed on cross member portion 12A or are preformed and selectively positioned on cross member 12A by hook and loop fasteners. The distance between cushion member 60A and 62A is predetermined in the manufacture and the distance between cushion member 60A and 62A is varied from article to article or the parent adjusts the distance by means of the hook and loop fasteners to accommodate the growth of the infant. This second embodiment of the cushion support apparatus still provides for lightweight transportation and washability. It also provides by means of similar securing straps 24A and 28A, a means for securing it to the car seat or baby seat to maintain it in position.

In this configuration, in conjunction with sizing guides attached to the packaging, the parent can determine which size cushion support apparatus is required at different stages of the infant's development, until such time as there is no longer any requirement for such a cushion support.

In all of the embodiments disclosed by Applicant, the parent is provided with a cushion support apparatus which provides positive support for the infant's head when the infant is positioned in a car seat, baby seat or the like. In the instance where the infant is premature or unusually small at birth, the first embodiment providing lateral support and support beneath the buttock is the most appropriate in order to maintain the infant in a secure and posture-proper position within the car seat, baby seat or the like. As the child matures in size, the need for the leg member of the first embodiment of the cushion support apparatus may lessen such that it can be unattached and the cross member support used in cooperation with the baby seat or car seat. It is also possible with respect to the third embodiment that the parent may choose a different size cross member head support for the infant at different stages of the infant's development in order to provide for a secure fit about the lateral sides of the head of the infant. In all instances, the embodiments disclosed herein provide support for the infant which has been suggested on numerous occasions by the pediatric community, but heretofore been unavailable to parents of young infants.

While there has been described a preferred embodiment of the apparatus, it is, of course, understood that many alternative embodiments can be employed without departing from the spirit and scope of the invention.

These and other features are deemed to be within the scope and breadth of the invention as encompassed by the following claims.

What is claimed is:

1. A cushion support apparatus for infants for use in cooperation with infant transport apparatus such as car seats and baby seats to maintain the infant's body and the infant's head in position, and to prevent them from tilting, said cushion support apparatus comprising:
a T-shaped planar cushion member having a facing side and an underside, said T-shaped planar member having an outer fabric shell and a cushioning layer disposed between said outer fabric shell, said T-shaped member defined by a cross member having a first end and a second end and a leg member having a first end and a second end, said leg member secured to said cross member along said first end of said leg member, perpendicularly to said cross member an equidistance from said first end and said second end of said cross member;
a plurality of first fastening means secured on said facing side of said cross member;
a plurality of second fastening means secured on said underside of said cross member, said first fastening means and said second fastening means cooperatively engageable to secure said first end and said second end of said cross member in holding relationship about the sides of said infant's head;
third fastening means secured on said facing side of said leg member, proximate to its lateral edges, said third fastening means for emovably securing lateral cushions on said facing side for lateral support of said infant's body sides.

2. A cushion support apparatus in accordance with claim 1 wherein said first, second and third fastening means comprise hook and loop fasteners.

3. A cushion support apparatus in accordance with claim 1 wherein said cross member of said cushion support has a plurality of securing straps extending therefrom for securing said cushion support apparatus to said infant transport apparatus.

4. A cushion support apparatus in accordance with claim 1 wherein said cross member and said leg members are removably secured to each other.

5. A cushion support apparatus in accordance with claim 1 wherein said cross member and said leg member have positioned therethrough, a plurality of aperatures cooperatively positioned to permit the securing strap of the infant transport apparatus to pass therethrough in order to secure the infant within the infant transport apparatus.

6. A cushion support apparatus in accordance with claim 1 wherein said lateral support cushions are tubular in shape having an outer fabric shell and a cushioning layer disposed within said outer fabric shell.

7. A cushion support apparatus in accordance with claim 1 wherein said cushion support apparatus is pliantly conformable to the shape or contour of the infant transport apparatus being utilized.

8. A cushion support apparatus for infants for use in cooperation with an infant transport apparatus such as car seats and baby seats to maintain the infant's body and infant's head in position, and to prevent them from tilting, said cushion support apparatus comprising:
a T-shaped planar cushion member having a facing side and an underside, said T-shaped planar member having an outer fabric shell and a cushioning layer disposed between said outer fabric shell, said T-shaped member defined by a cross member having a first end and a second end and a leg member having a first end and a second end, said leg member secured to said cross member along said first end of said leg member, perpendicularly to said cross member an equidistance from said first end and said second end of said cross member;

a plurality of fastening means secured on said facing side of said cross member;

a plurality of fastening means secured on said facing side of said leg member, proximate to the lateral edges of said leg member;

a plurality of tubular cushions; said tubular cushions having an outer fabric shell and a cushion material disposed within said outer fabric shell, said plurality of tubular cushions having a fastening means secured on their outer tubular surface, said fastening means on said tubular cushions engageable with said fastening means on said T-shaped planar cushion member to provide lateral support about the head and body of the infant; and further fastening means on the facing and underside of the leg member, said further fastening means adapted to cooperate to releasably secure the lower edge portion of the leg member in a rolled upon itself configuration.

9. A cushion support apparatus in accordance with claim 8 wherein said fastening means on said T-shaped planar cushion member, said fastening means on said tubular cushion members and said further fastening means, comprises hook and loop fasteners.

* * * * *